3,594,477
Patented July 20, 1971

3,594,477
OPTICALLY ACTIVE PYRIDINE DERIVATIVES IN PHARMACEUTICAL COMPOSITIONS AND THEIR USE AS ANALGESICS AND STIMULANTS
Hartmund Wollweber and Rudolf Hiltmann, Wuppertal-Elberfeld, Friedrich Hoffmeister, Wuppertal-Vohwinkel, and Hans-Güenther Kroneberg, Wuppertal-Elberfeld, Germany, assignors to Farbenfabriken Bayer AG, Leverkusen, Germany
No Drawing. Continuation-in-part of abandoned application Ser. No. 566,255, July 19, 1966. This application Jan. 14, 1969, Ser. No. 791,135
Claims priority, application Germany, July 24, 1965, F 46,713
Int. Cl. A61k 27/00
U.S. Cl. 424—263
16 Claims

ABSTRACT OF THE DISCLOSURE

Dextro-rotatory and levo-rotatory isomers of N-acyl-N-(2′-pyridyl)-1-piperidino-2-aminopropanes of the formula:

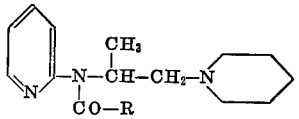

wherein R is methyl or ethyl or a pharmaceutically acceptable non-toxic acid salt thereof exhibit pharmaceutical properties which differ qualitatively from the racemate. The L-isomer exhibits approximately the same analgesic activity as the racemate but also exhibits a strong sedative effect. The D-isomer exhibits approximately the same analgesic activity as the racemate but exhibits also a central nervous system stimulant effect.

---

The application is a continuation-in-part of Ser. No. 566,255 filed July 19, 1966, now abandoned.

The present invention is concerned with optically active pyridine derivatives. More particularly, the present invention is based on the surprising discovery that the resolution of certain racemic pyridine derivatives results in optically active isomers which have qualitative differences rather than the quantitative differences which would normally be expected.

It is known that N-acyl-N-(2′-pyridyl)-1-piperidino-2-aminopropanes of the formula:

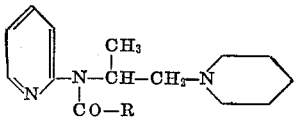

wherein R represents methyl or ethyl, have analgesic activity, for example, British Pat. 939,947. As is the case with many other known analgesics, these compounds contain an asymmetric carbon atom. Based on general experience, it would be expected that the corresponding optical isomers which make up the racemate of these compounds would exhibit considerable quantitative differences vis-à-vis one another with respect to the extent of their analgesic activity.

It was quite unexpected to discover that the resolution of the above N-acyl-N-(2′-pyridyl)-1-piperidino-2-aminopropanes results in the preparation of the corresponding optically active levo- and dextro-rotatory isomers which differ qualitatively rather than quantitatively from each other in their activity and, more particularly, that the levo- and dextro-rotary isomers possess certain distinctly different pharmaco-local properties.

The preparation of the above optically active N-acyl-N-(2′-pyridyl)-1-piperidino-2-aminopropanes can be accomplished by resolution procedures which are per se known, namely, the procedures which involve the resolution of the racemic bases. A preferred method of resolution is the process which proceeds via the salts of the compounds with optically active acids. In particular, D(−)- and L(+)-tartaric acid have been found to be particularly suitable.

These optically active isomers of N-acyl-N-(2′-pyridyl)-1-piperidino-2-aminopropanes can also be directly synthesized by treating the corresponding optically active levo-rotatory or dextro-rotatory N-(2′-pyridyl)-1-piperidino-2-aminopropanes of the formula:

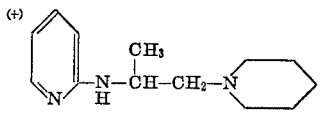

or

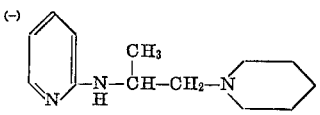

or their reactive derivatives with acetylating or propionylating agents. Acetyl or propionyl chlorides, anhydrides, esters or nitriles have been found to be especially suitable acetylating or propionylating agents.

The resultant optically active N-acyl-N-(2′-pyridyl)-1-piperidino-2-aminopropanes constitute oils which can be distilled in vacuo and which form salts, which are usually soluble in water, with pharmacologically harmless inorganic or organic acids. For example, hydrochloric acid, sulfuric acid, phosphoric acid, nitric acid, acetic acid, succinic acid, glutaric acid, optically active and racemic tartaric acid, maleic acid, fumaric acid, citric acid, mandelic acid, optically active and racemic camphor-sulfonic acid, and the like have been found particularly suitable. Other suitable inorganic or organic acids may also be used.

If optically active N-(2′-pyridyl)-1-piperidino-2-aminopropanes are employed as the starting materials, these compounds can be obtained by the resolution of the racemic bases with optically active acids or by the hydrolysis of optically active N-acyl-N-(2′-pyridyl)-1-piperidino-2-aminopropanes.

With regard to the properties of the levo-rotatory and dextro-rotatory isomers, it was quite surprising to discover that qualitative rather than quantitative differences existed. The racemic form of N-propionyl-N-(2′-pyridyl)-1-piperidino-2-aminopropane has a strong analgesic activity in conjunction with a weak sedative activity. It was surprising to discover that its levo-rotatory isomer, while having about the same intensity of analgesic activity, possesses an appreciably stronger sedative effect. The dextro-rotatory isomer, while exhibiting comparable analgesic activity, possessed instead of a sedative effect, as would normally be expected, a stimulant effect on the central nervous system.

At our present stage of chemotherapy and drug treatment, it is extremely important that pharmaceuticals employed in specific instances have the best possible specific activities for use under the circumstances which are involved. It is, therefore, of great importance that undesirable side effects be minimized or eliminated in order to enhance treatment. It will, therefore, be appreciated that under some circumstances it might be desirable to employ a strong analgesic possessing strong sedative properties for one patient, whereas in a different patient where different considerations might be involved it would be undesirable, or perhaps even prohibitive, to employ an analgesic which additionally had a strong sedative effect. For example, a distinctly dissociating and sedative effect is required from an analgesic when such is employed in preparation for an operation or for post-operative pain relief. In contrast, however, sedative damping effects of an analgesic would be undesirable, and perhaps dangerous, during a course of treatment of chronic pains in an ambulant patient since such sedative effects would impair his critical and reaction faculties and, thus, serious harm could result to such a patient while he was moving about or engaged in activities, such as driving a vehicle.

It has been found that the levo-rotatory N-propionyl-N-(2′-pyridyl)-1-piperidino-2-aminopropane is superior to the racemic form and to the dextro-rotatory isomer as a preparation for use in pre-operative or post-operative circumstances where pain relief and marked sedative properties are desirable.

It has also been discovered that the dextro-rotatory isomer is superior to the racemic form and to the levo-rotatory isomer as preparations to be used in the treatment of ambulant patients since, while this isomer has strong analgesic activity, it also completely lacks sedative properties which result in damping the central nervous system.

Also a part of the present invention are pharmaceutical compositions which comprise one or more optically active isomers of the pyridine derivatives of the present invention. Thus, a pharmaceutical composition may be formed containing one or more optically active dextro-rotatory isomers which pharmaceutical compositions would be useful in therapy as a combined analgesic and central nervous system stimulant. Pharmaceutical compositions according to the present invention also comprise one or more levo-rotatory isomers of the pyridine derivatives of the present invention and such pharmaceutical compositions are useful for their combined analgesic and sedative effects. A pharmaceutically acceptable non-toxic acid salt of such an isomer may also be used as the active ingredient in such a pharmaceutical composition. The optically active isomer or isomers selected are combined with a pharmaceutically acceptable non-toxic inert carrier and may be formed into a therapeutically suitable composition by techniques which are per se known by those skilled in the art.

The following non-limitative examples illustrate some selected methods for producing the levo- and dextro-rotatory isomers above referred to, as well as comparative data illustrating the therapeutic effect of representative compounds and compositions according to the present invention.

EXAMPLE 1

Levo-rotatory N-propionyl-N-(2′-pyridyl)-1-piperidino-2-aminopropane

One hundred eighty-five g. racemic N-propionyl-N-(2′-pyridyl)-1-piperidino-2-aminopropane and 110.25 g. L(+)-tartaric acid are dissolved in 1420 ml. alcohol. After several hours, the separated crystals are filtered off and 132 g. of the tartrate salt are obtained, which is recrystallized once more from 600 ml. alcohol. Yield of L(+)-tartrate 107.1 g. (M.P. 152–154° C.), $$[\alpha]_{578}^{20} -31°$$

(1.4% methanol). The free base is obtained by the addition of sodium hydroxide solution and is oily, $$[\alpha]_{578}^{20} -47.3°$$

(1.45% chloroform); hydrochloride M.P. 152–154° C. (isopropanol), $$[\alpha]_{578}^{20} -53°$$

(1.04% methanol).

EXAMPLE 2

Dextro-rotatory N-propionyl-N-(2′-pyridyl)-1-piperidino-2-aminopropane

The mother liquor of the tartrate obtained in Example 1 is evaporated off, taken up in water, and rendered alkaline. The separated crude oily dextro-rotatory base is further purified with the aid of D(−)-tartaric acid according to the procedure described in Example 1. D(−)-tartrate M.P. 152–154° C., $$[\alpha]_{578}^{20} +31.75°$$

(1.01% methanol); free base $$[\alpha]_{578}^{20} +47.6°$$

(1.3% chloroform); hydrochloride M.P. 152–154° C., $$[\alpha]_{578}^{20} -52.9°$$

(1.3% methanol).

The N-propionyl-N-(2′-pyridyl)-1-piperidino-2-aminopropane, of B.P. 153–155° C./0.2 mm. Hg and with fumarate of M.P. 122–123° C., employed as the starting material can be produced by the following method:

1-piperidino-2-aminopropane, of B.P. 78–82° C./13 mm. Hg (obtained by the reductive amination of piperidino-acetone with ammonia and hydrogen in the presence of Raney Co as the catalyst) is reacted with 2-bromopyridine to form N-(2′-pyridyl)-1-piperidino-2-aminopropane, of B.P. 112–114° C./0.3 mm. Hg, which is subsequently acylated with propionic anhydride.

EXAMPLE 3

Levo-rotatory N-acetyl-N-(2′-pyridyl)-1-piperidino-2-aminopropane

Twenty g. of levo-rotatory N-(2′-pyridyl)-1-piperidino-2-aminopropane are heated under reflux for ten hours with 40 ml. acetic anhydride. It is subsequently evaporated off in vacuo and the residue is taken up in water. The base is precipitated from the solution with sodium hydroxide solution, taken up in ether and dried over potassium carbonate. After driving off the ether, it is distilled and 15 g. of the free levo-rotatory base of B.P. 120–122° C./0.4 mm. Hg and $$[\alpha]_{578}^{20} -53.60°$$

(1% chloroform) are obtained. Addition of L(+)-tartaric acid in alcohol produces the L(+)-tartrate of M.P. 172–174° C. and $$[\alpha]_{578}^{20} -38.1°$$

(1.09% methanol). The levo-rotatory N-(2′-pyridyl)-1-piperidino-2-aminopropane employed as the starting material can be obtained by the hydrolysis of levo-rotatory N-propionyl - N - (2′-pyridyl)-1-piperidino-2-aminopropane (cf. Example 1) with hydrochloric acid. B.P. 116–118° C./0.6 mm. Hg, $$[\alpha]_{578}^{20} -41.4°$$

(1.22% chloroform).

EXAMPLE 4

Dextro-rotatory N-acetyl-N-(2′-pyridyl)-piperidino-2-aminopropane

This compound is obtained from dextro-rotatory N-(2′-pyridyl)-1-piperidino-2-aminopropane [B.P. 116–118° C./ Hg, $$[\alpha]_{578}^{20} +41.6°$$

(1.3% chloroform)] and acetic anhydride according to the procedure described in Example 3. Free base of B.P. 120–122° C./0.5 mm. Hg, $$[\alpha]_{578}^{20} +53.8°$$

(1.7% chloroform); D(−)-tartrate of M.P. 172–174° C., $$[\alpha]_{578}^{20} -38.3°$$

(1.13% methanol).

The products of Examples 1 and 2 (called respectively, Product I, i.e., levo-rotatory N-propionyl-N-(2′-pyridyl)-1-piperidino - 2 - aminopropane or levo-rotatory N - [2′-(1-piperidinopropyl)] - N - (2 - pyridyl) - propionamide, and Product II, i.e., dextro-rotatory N-propionyl-N-(2′-pyridyl)-1-piperidino - 2 - aminopropane or dextro-rotatory N-[2-(1-piperidinopropyl)]-N-(2-pyridyl) - propionamide were the subject of particularly detailed studies for the purpose of evaluating their pharmacological properties and their therapeutic applications, especially as analgesics. Herein following are given the results obtained which show that these compounds are powerful analgesics presenting different types of action.

(1) Acute toxicity:

TABLE I

| Manner of administration | Example 1 Product I: $DL_{50}$, mg./kg.[1] | Example 2 Product II: $DL_{50}$, mg./kg.[1] |
|---|---|---|
| Mouse ........ Subcutaneously... | 306(238-349) | 222(175-281) |
| Rat ................ do ............ | 367(282-469) | 305(224-355) |

[1] $DL_{50}$=Mean lethal dose.

(2) Analgesic effect:

TABLE II

Comparison of the Analgesic Effects of Products I and II

| | | Example 2 | | | |
|---|---|---|---|---|---|
| | | Product I | | Product II | |
| Test device | Manner of administration | Effect, $DE_{50}$, mg./kg.[1] | Therapeutic index | Effect, $DE_{50}$, mg./kg. | Therapeutic index |
| Test on tails of mice ...... | Subcutaneously... | 18(15-24) | 17 | 13(10-16) | 17 |
| Test on joints (rats) .......... | do .............. | 20(9-29) | 18 | 19(6-30) | 16 |
| Test on paws (rats) .......... | do .............. | 27(17-38) | 14 | 20(15-26) | 15 |

[1] $DE_{50}$=Mean effective dose.

It results from Table II that Products I and II have an approximately as intense an analgesic effect on the mouse as on the rat.

(3) Sedative effect on the dog and on the cat:

dles characterizing sleep, and thus reduced alertness, according to the encephalogram.

Product II acts in exactly contrary fashion upon an equal dose. It causes a decrease of amplitude, increase of frequency and reduction of spindles characterizing sleep. It thus increases alertness according to the electro-encephalogram.

In the cat, the two products administered in doses of 12 mg./kg. intramuscularly exert analogous effects on the electro-encephalogram. In this case, too, Product I reduces alertness while Product II causes increased alertness.

The different effects of the products on the behavior of animals, presented in Table III, have thus been confirmed by tests made on electro-encephalograms. Thus, Product I is a substance with a clearly sedative effect, Product II is a substance exercising an effect of excitation on the central nervous system.

TABLE III

Effect of Product I and of Product II on the Spontaneous Behavior of the Dog and of the Cat

| | | Product I | | | Product II | | |
|---|---|---|---|---|---|---|---|
| Type of animal | Dose, mg./kg. s.c. | No. of tests | Effect | Duration of symptoms | No. of tests | Effect | Duration of symptoms |
| Dog .................... | 1 | 1 | No symptoms .............................. | | | | |
| | 3 | 1 | Slight fatigue ................ | 30 min .............................. | | | |
| | 6 | 1 | Sedation ...................... | >2 hrs. 30 min ...... | 1 | No symptoms .................. | |
| | 10 | 1 | Sedation, staggering gait .... | >6 hrs .............. | 1 | Trembling, no sedation ...... | 1 hr. 40 min. |
| Cat ...................... | 5 | 1 | No symptoms .............................. | | 1 | No symptoms .................. | |
| | 10 | 1 | Sedation ...................... | >5 hrs. 30 min ...... | 1 | Agitation .................... | >6 hrs. 30 min. |

As is shown in Table III, Product I exercises a sedative effect, Product II has practically no sedative action.

(4) Effects on the electro-encephalogram:

Product I, administered intramuscularly to rabbits in doses of 31 mg./kg., causes modifications of the electro-encephalogram, characterized by an increase of amplitude, slowing of the frequency, increased appearance of spin- (5) Study on the effects of producing toxicomania in monkeys addicted to morphine:

It was checked particularly whether the two products could replace in such animals the effect of morphine or whether, as in the case of N-allyl-normorphine, they could suppress the effect of morphine. The studies on the effect of replacing morphine are presented in Table IV.

TABLE IV

Influence on the Symptoms of Morphine Deprivation in Monkeys
(Effect of morphine replacement)
(Application of the test substance 24 hours after stoppage of morphine, at the peak of deprivation)

| Substance | Dose, mg./kg. s.c. | Number of tests | Animal number | Intensity of deprivation manifestations | Effect of the symptoms of deprivation |
|---|---|---|---|---|---|
| Product I, Example 1 ............ | 6 | 6 | I | 1X++/5X+++ | 1X(-)/5Xφ |
| | 6 | 7 | II | 1X++/6X+++ | 2X(-)/5Xφ |
| | 6 | 6 | III | 1X++/5X+++ | 2X(-)/4Xφ |
| | 6 | 1 | IV | 1X+++ | (-) |
| | 12 | 2 | V | 2X+++ | 2Xφ-(-) |
| | 18 | 2 | V | 2X+++ | 2Xφ-(-) |
| Product II, Example 2 ............ | 6 | 4 | I | 3X++/1X+++ | 4Xφ |
| | 6 | 5 | II | 5X+++ | 5Xφ |
| | 6 | 4 | III | 4X+++ | 1X(-)/3Xφ |
| | 6 | 1 | IV | 1X+++ | 1Xφ |
| | 12 | 2 | V | 2X+++ | 2Xφ |
| | 18 | 2 | V | 2X+++ | 2Xφ |

Manifestations of deprivation:
  Reduced manifestations of deprivation: +=fear, showing of teeth.
  Clearly average manifestions of deprivation: ++=stooped gait, bristly fur, whistling, the animal licks its own urine, movements of mastication, clicking of the tongue.
  Intense manifestations of deprivation: +++=groaning, lateral decubitus, erection, masturbation, ventral sensations, spasms of the extremeties, agitation.
Effect on the manifestations of deprivation:
  No effect: φ=all the manifestations of deprivation are present.
  Slight effect: (-).
  Medium-clear effect: (-)(-)=suppression of part of the manifestations of deprivation.
  Intense effect: (-)(-)(-)=total suppression of the manifestations of deprivation.

As is shown by Table IV, Product I actually replaces in a clear manner the effect of morphine in only a part of the tests. Product II is inactive in this respect.

The studies on the effect antagonistic to that of morphine, made on monkeys addicted to morphine, are shown in Table V.

TABLE V

Study of Effects Antagonistic to those of Morphine Exerted by Products I and II on Monkeys Addicted to Morphine

| Substance | Dose, mg./kg. s.c. | Number of animals | Intensity of manifestations of deprivation [1] |
|---|---|---|---|
| Product I, Example 1 | 3 | 3 | φ |
|  | 6 | 2 | φ−(+) |
|  | 12 | 1 | ++ |
|  | 18 | 4 | +++ |
|  | 24 | 3 |  |
| Product II, Example 2 | 1 | 1 | φ |
|  | 2 | 1 | φ |
|  | 3 | 3 | ++ |
|  | 6 | 3 | + |
|  | 12 | 1 | ++ |
|  | 18 | 4 | ++ |

[1] See Table IV for a legend of the symbols.

The two products inhibit the effect of morphine in monkeys addicted to morphine, i.e., they provoke symptoms of deprivation. Product II has a more intense action than Product I.

(6) Critical examination:

According to the experimental tests effected on animals as described hereinabove, the two products are intense-action analgesics, which do not have an effect analogous to that of morphine and which cannot replace morphine in animals addicted to it. It can be expected, therefore, that in human beings, too, they do not provoke the effect of deprivation characteristics of morphine and its derivatives.

As can be seen from the above set forth data, Product I exhibits a clear sedative effect in addition to its analgesic activity and Product II exhibits central nervous system stimulant effect in addition to its analgesic activity.

As the demands of therapy become more specialized and selective, it is important to have pharmaceutical products which are as specific in their actions as possible. Thus, in certain circumstances, it would be most undesirable to administer an analgesic having sedative effects since the therapy required might call for administration of an analgesic having central nervous system stimulant effect. By contrast, in the treatment of post-operative pain, one desires in addition to sufficient analgesic effect a pronounced tranquilizing and sedative effect because the patient should also be physiologically calmed. Under such circumstances, the L-isomers of the present invention would be indicated for treatment since they combine analgesic activity with a marked sedative effect.

For the treatment of chronic pain in ambulatory patients, it would be desirable to have an analgesic having also a central nervous system stimulant effect in order to prevent depression and assist a patient in maintaining an active state.

Since the analgesic activity of the isomers of the present invention is approximately equal in intensity, the compounds can be administered in equivalent doses and it has generally been found that the oral unit dosage range should be 20 to 50 mgs. with the daily dose being in the range of 20 to 250 mgs. It is generally preferable, as in the case of any therapeutic substance, to administer several unit doses over the period of a day rather than administering one single large amount. The compounds of the present invention are also suitable for parenteral administration, that is, i.m., s.c. and i.v., and 25 to 75 mgs. are a suitable unit dose with 25 to 300 mgs. as the general daily dose.

What is claimed is:

1. A pharmaceutical composition useful as an analgesic and central nervous system stimulant which comprises a therapeutically effective amount of an optically active dextro-rotatory isomer of a compound of the formula:

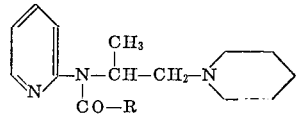

wherein R is methyl or ethyl or a pharmaceutically acceptable non-toxic acid salt thereof in combination with a pharmaceutically acceptable non-toxic inert carrier.

2. A pharmaceutical composition useful as an analgesic and central nervous systems stimulant which comprises a therapeutically effective amount of dextro-rotatory N-acetyl-N-(2'-pyridyl)-1-piperidino-2-aminopropane or a pharmaceutically acceptable non-toxic acid salt thereof in combination with a pharmaceutically acceptable non-toxic inert carrier.

3. A pharmaceutical composition useful as an analgesic and sedative which comprises a therapeutically effective amount of levo-rotatory N-acetyl-N-(2'-pyridyl)-1-piperidino-2-aminopropane or a pharmaceutically acceptable non-toxic acid salt thereof in combination with a pharmaceutically acceptable non-toxic inert carrier.

4. A pharmaceutical composition useful as an analgesic and central nervous system stimulant which comprises a therapeutically effective amount of dextro-rotatory N-propionyl-N-(2'-pyridyl)-1-piperidino-2-aminopropane or a pharmaceutically acceptable non-toxic acid salt thereof in combination with a pharmaceutically acceptable non-toxic inert carrier.

5. A pharmaceutical composition useful as an analgesic and sedative which comprises a therapeutically effective amount of levo-rotatory N-propionyl-N-(2'-pyridyl)-1-piperidino-2-aminopropane or a pharmaceutically acceptable non-toxic acid salt thereof in combination with a pharmaceutically acceptable non-toxic inert carrier.

6. A method of alleviating pain and providing a sedative effect which comprises administering to a human in need thereof a therapeutically effective amount of an optically active levo-rotatory isomer of a compound of the formula:

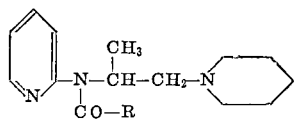

wherein R is methyl or ethyl, or a pharmaceutically acceptable non-toxic acid salt thereof.

7. A method according to claim 6 wherein the therapeutically effective amount is from 20 mg. to 300 mg. per day.

8. A method according to claim 7 wherein the daily dose is administered in unit doses of 20–75 mg., said administration being spaced across the day.

9. A method of alleviating pain and providing a sedative effect which comprises administering to a human in need thereof a therapeutically effective amount of levo-rotatory N-acetyl-N-(2'-pyridyl)-1-piperidino-2-aminopropane or a pharmaceutically acceptable non-toxic acid salt thereof.

10. A method of alleviating pain and providing a sedative effect which comprises administering to a human in need thereof a therapeutically effective amount of levo-rotatory N-propionyl-N-(2' - pyridyl) - 1 - piperidino-2-aminopropane or a pharmaceutically acceptable non-toxic acid salt thereof.

11. A method of alleviating pain and providing central nervous stimulative effect which comprises administering to a human in need thereof a therapeutically effective amount of dextro-rotatory N-acetyl-N-(2'-pyridyl)-1-piperidino-2-aminopropane or a pharmaceutically acceptable non-toxic acid salt thereof.

12. A method of alleviating pain and providing central nervous stimulative effect which comprises administering to a human in need thereof a therapeutically effective amount of dextro-rotatory N-propionyl-N-(2'-pyridyl)-1-piperidino-2-aminopropane or a pharmaceutically acceptable non-toxic acid salt thereof.

13. A pharmaceutical composition useful as an analgesic and sedative which comprises a therapeutically effective amount of an optically active levo-rotatory isomer of a compound of the formula

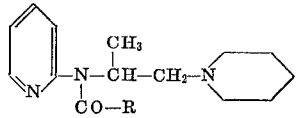

wherein R is methyl or ethyl or a pharmaceutically acceptable non-toxic acid salt thereof in combination with a pharmaceutically acceptable non-toxic inert carrier.

14. A method of alleviating pain and providing a stimulative effect which comprises administering to a human in need thereof a therapeutically effective amount of an optically active dextro-rotatory isomer of a compound of the formula

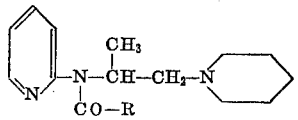

wherein R is methyl or ethyl, or a pharmaceutically acceptable non-toxic acid salt thereof.

15. A method according to claim 14 wherein the therapeutically effective amount is from 20 mg. to 300 mg. per day.

16. A method according to claim 15 wherein the daily dosage is administered in unit dosages of 20–75 mg., said administration being spaced across the day.

References Cited

UNITED STATES PATENTS 3,163,654   12/1964   Hiltmann et al. _____ 260—294

OTHER REFERENCES

Jenkins et al.: Chemistry of Organic Medicinal Products, 3rd Ed. (1949), pp. 662–666 and 635–638.

Fieser et al.: Advanced Organic Chemistry (1961), pp. 84–89.

STANLEY J. FRIEDMAN, Primary Examiner

U.S. Cl. X.R.

260—294